Nov. 3, 1970 R. O. KERR 3,537,875
METHOD AND APPARATUS FOR APPLYING INSULATING MATERIAL
ONTO ARTICLES OF MANUFACTURE
Filed March 4, 1968 2 Sheets-Sheet 2
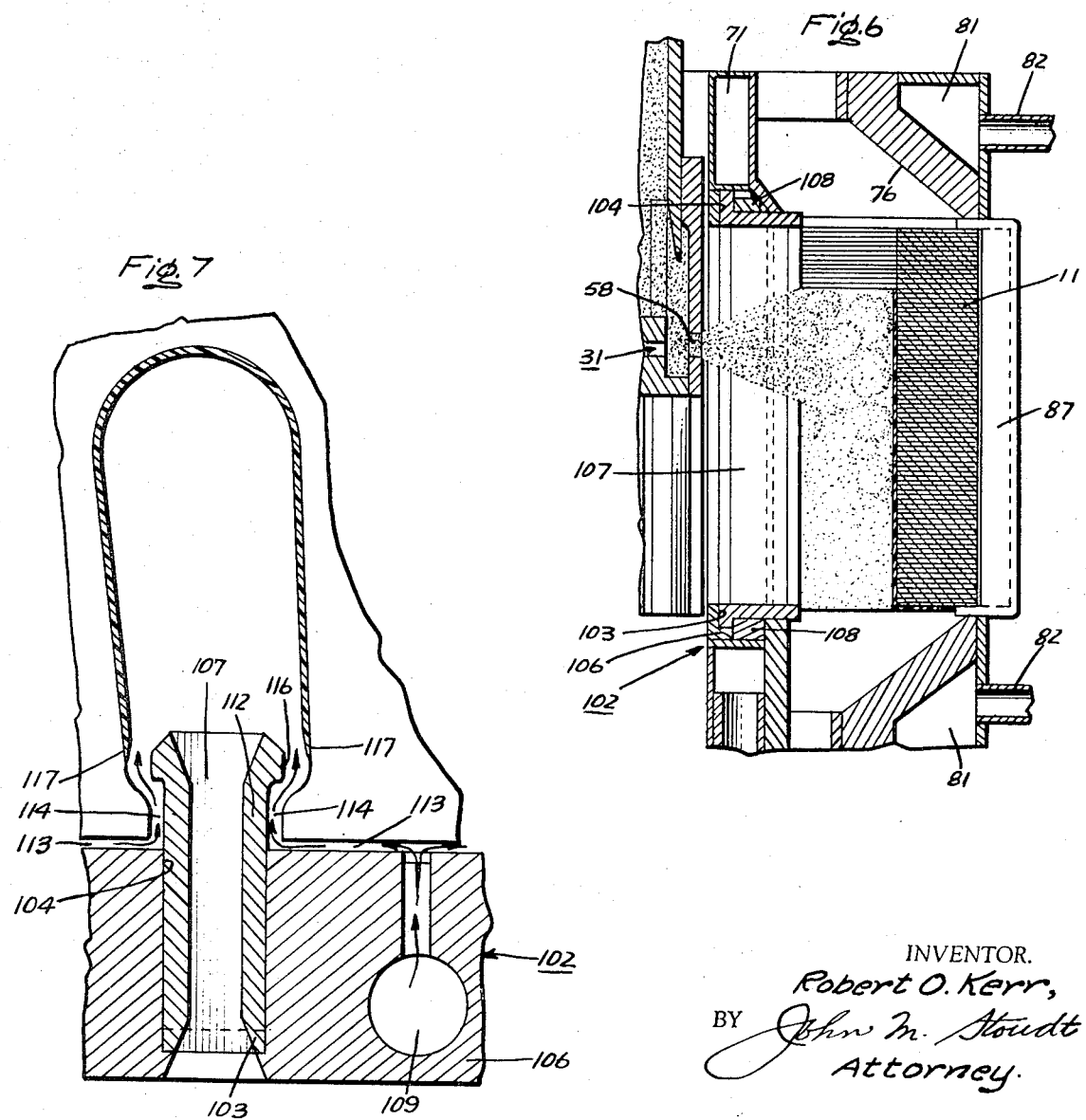
INVENTOR.
Robert O. Kerr,
BY John M. Stoudt
Attorney.

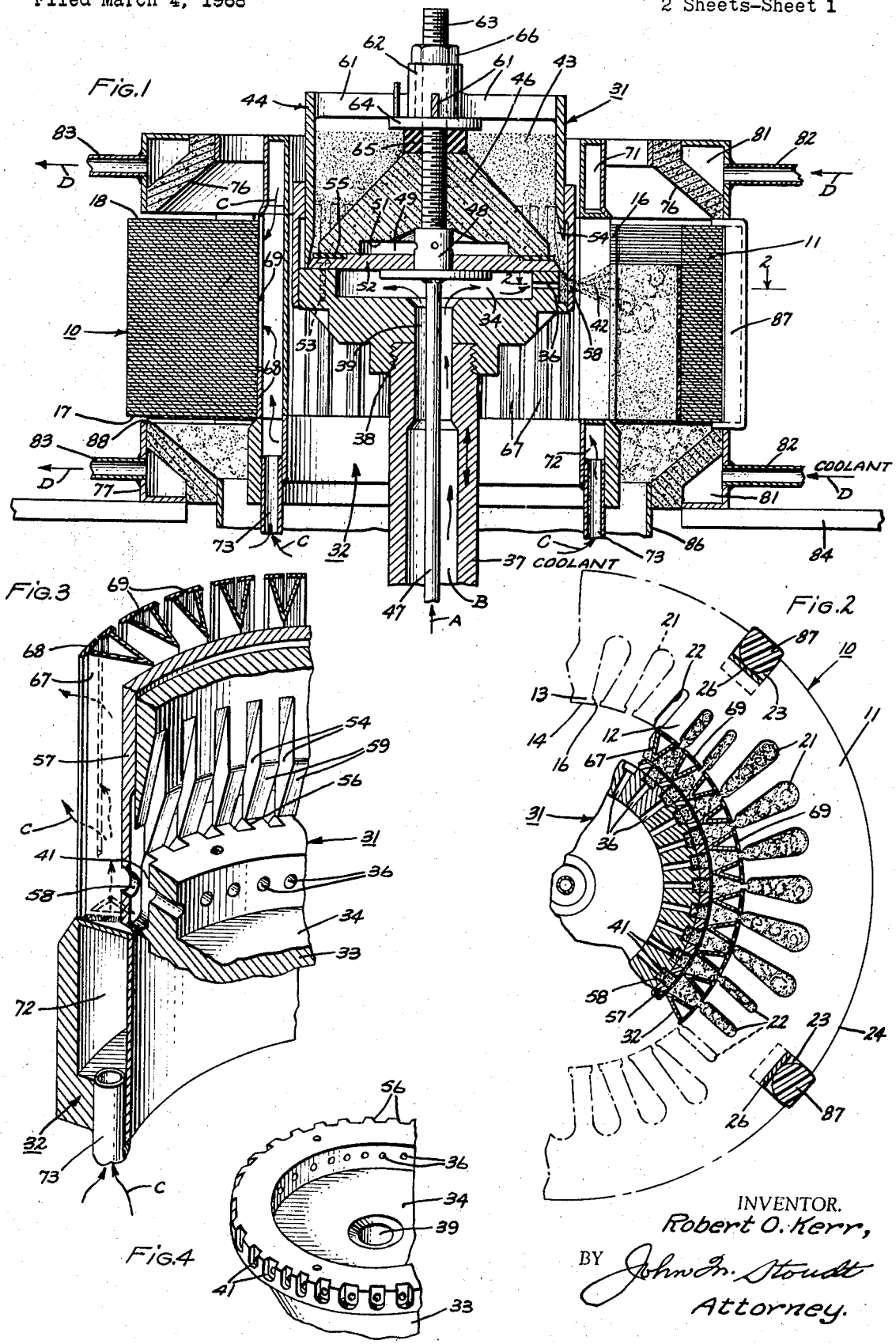

United States Patent Office 3,537,875
Patented Nov. 3, 1970

3,537,875
METHOD AND APPARATUS FOR APPLYING INSULATING MATERIAL ONTO ARTICLES OF MANUFACTURE
Robert O. Kerr, Fort Wayne, Ind., assignor to General Electric Company, a corporation of New York
Continuation-in-part of application Ser. No. 609,151, Jan. 13, 1967. This application Mar. 4, 1968, Ser. No. 715,465
Int. Cl. B05b 7/24; B44d 1/08, 1/094
U.S. Cl. 117—18                                    16 Claims

ABSTRACT OF THE DISCLOSURE

Method and apparatus especially adapted for applying a solid mass of electrical insulating material, capable of coalescing, onto selected and pre-heated walls of a number of slots having entrances at a peripheral surface (e.g., coil accommodating slots of a magnetic core). A plurality of separated material streams are directed from an applicator unit toward the entrances and a material controlling unit, having walls disposed between the peripheral surface and the applicator unit, maintaining these streams in a separated relation as the streams travel into the slots. The latter unit also tends to prevent material build-up on the peripheral surface between adjacent slot entrances. End faces of the slotted structure can also be coated by material forced out of the slot ends and into contact with material deflectors mounted next to the end faces.

CROSS-REFERENCE TO RELATED APPLICATION

This is a continuation-in-part of my co-pending application Ser. No. 609,151 filed Jan. 13, 1967, now abandoned.

BACKGROUND OF THE INVENTION

This invention relates to a method and apparatus for applying insulating material on articles of manufacture, and more specifically, to an improved method and apparatus for especially forming an integral layer of electrical insulating material on desired locations of slotted magnetic cores of electrical inductive devices, such as stator and armature cores for dynamoelectric machines.

Electrical inductive devices, such as dynamoelectric machines, customarily include one or more core members formed on magnetic material which are provided with a series of slots for accommodating excitation windings. These windings are ordinarily composed of a number of turns of magnetic wire conductors having a thin covering of insulation. Since the cores conventionally include a stack of thin laminations which have been stamped out of magnetic sheet material, the edges of the laminations, especially at the entrances of the slots on each side face of the core, contain burrs and other sharp projections, unless properly covered with insulation material, tend to cause breaks in the wire insulation which may ultimately result in short circuit of the wire conductors. In addition, it is necessary to provide a tough and uniformly imperforate ground insulation between the core and the winding which is sufficiently thin in cross-section to permit optimum utilization of slot area for accommodating the sides of the windings, yet will not break down at the maximum temperature encountered during machine operation.

It is also desirable, if not essential, that the ground insulation have high cut-through, mechanical shock, and moisture resistances as well as excellent electrical properties. Although ground insulation covering the winding slots, core end faces, and slot edges at the end faces is normally in the range between 7.5 and 15 mils, generally speaking, an imperforate, uniform, insulating layer slightly over 7 mils, for example 10 mils in thickness is considered to be optimum. This thickness not only provides the requisite mechanical and electrical qualities but also permits good utilization of available slot area for accommodating windings, especially critical in cores of short stack lengths (e.g., less than 1.3 inches) for small and fractional horsepower motors which have slots of irregular configurations and small cross-section areas.

One of the most attractive approaches in recent years for providing the ground insulation, from the standpoint of versatility in core manufacture and general product quality, is the one in which an insulating coating material, such as epoxy resin, is applied in powder form onto exposed and heated surfaces of the core. The applied powder material melts, flowing slightly while gelling, finally coalescing and hardening into an integral, adherent layer on the pre-heated walls. Commercially available coating materials having the requisite electrical and mechanical properties, mentioned heretofore, normally melt and flow in the temperature range between 190° C. and 232° C. Thus, the core is usually pre-heated at least to a point in the upper part of the temperature range, the precise temperature being dependent upon several factors; e.g., exact material used, the material's deterioration temperature and gellation characteristics, that is, its ability to flow while gelling which is directly affected by the amount of heat being dissipated from the surfaces on which the material has been deposited.

Two important factors which directly effect and influence the type of insulating layer obtained with commercially available insulating materials, are the rapid rate at which the slot walls and end faces of the core decrease in temperature under ambient temperature conditions and the different heat loss rate between the slot walls at the center of the core and near the core periphery. For instance, in slotted magnetic core constructions having the short stack lengths and low mass (e.g., below three pounds) the surfaces to be coated at the periphery of the core normally drop in temperature from 232° C. to less than the minimum 190° C. in less than thirty seconds, the exact time being primarily dependent upon such factors as the mass of the core, the location of the surface, and the total exposed surfaces available for dissipating the heat from the core. In view of this heat loss problem, there has been a practical difficulty to provide satisfactory ground insulation on cores, particularly on those regions of the slots next to the slot entrances, and on end faces in the vicinity of the bore with respect to stator cores. Still referring to stator cores, this difficulty is pronounced since in certain prior practices, insulating material was applied from one location and a separate device was utilized in the bore to prevent build-up of material at that part of the core. In some cases, the device not only prevented build-up at the periphery of the bore but also in the regions of the slots and end faces adjacent the bore. Moreover, certain material applying techniques were limited for use with articles in which slots extend entirely through the article from end to end.

SUMMARY OF THE INVENTION

Consequently, it is a primary object of the present invention to provide an improved method and apparatus for applying insulating material onto preselected regions of articles of manufacture; it is a more specific object to provide an improved method and apparatus for forming an improved integral layer of insulating material on preselected regions of slots whether or not the slots extend entirely through the article having the slots and even though the article is small in size and a low mass.

It is another object of the present invention to provide an improved method and apparatus for applying electrical insulating material onto preselected regions of magnetic cores for use in inductive devices, and in particular, with respect to cores having slot entrances in communication with peripheral surfaces thereof, to provide improved coverage adjacent those surfaces in a rapid yet economical manner.

It is yet another object of the present invention to provide an improved method and apparatus for applying powder electrical insulating material onto pre-heated magnetic cores which overcome the problems and difficulties mentioned above.

In carrying out the objects of the present invention in one form thereof, I provide an improved method for forming an adherent, generally uniform and imperforate, continuous coating of insulating material on the walls of preselected slots in a slotted structure having the slots in communication with a peripheral surface of the structure. The method is especially effective when providing an insulating coating on the walls of coil accommodating slots and on selected regions of end faces of a magnetic core when the material is a solid mass which coalesces when heated to a predetermined temperature and the walls to be coated are preheated above that temperature. More specifically, a plurality of separated streams of the material are simultneously directed toward the slots entrances associated with the preselected slots from locations adjacent the slot entrances, for instance in the bore of the core. These streams are maintained in separated relation by material controlling means which also serves to prevent material build-up on the peripheral surface between adjacent streams. Material entering the preselected slots makes engagement with the slot walls to coat the walls.

Insulative material may be stored in a reservoir having a fluidized bed where solid fusible material is employed, in the vicinity of the locations, for instance next to the bore of a stator, and simultaneously transferred from the reservoir to those locations. In addition, as the material enters the preselected slots, some of it is forced beyond the slots in the vicinity of at least one of the end faces and this material may be directed into engagement with selected regions of the end face.

By a further aspect of the present invention, apparatus is provided particularly adapted to carry out the method. In one form it includes an applicator unit having a head formed with a gas distributing chamber and a plurality of passages extending from the chamber to receses adapted to receive insulating material supplied thereto through a number of channels which are in free communication with the material reservoir. Gas is fed to the chamber and passages through nozzle means, disposed toward the slot entrances next to the recesses, in alignment with the entrances. Moreover, means such as a plurality of hollow partition members having walls arranged between the nozzle means and the slot entrances are employed to keep the individual streams of material divided or separated and to prevent material build-up on the peripheral surface between adjacent entrances.

Consequently, among other advantageous features, the present invention not only efficiently produces a satisfactory integral insulating coating of the desired thickness and quality on selected regions, but also effectively minimizes the tendency of the slotted structure to lose its heat below the predetermined temperature where preheated structures are utilized. In addition, the present invention is quite versatile in nature and material build-up in regions not to be covered, such as regions near the peripheral surface (e.g., stator bore), and on parts of the end faces is economically prevented.

The subject matter which I regard as my invention is particularly pointed out and distinctly claimed in the concluding portion of this specification. My invention itself, however, both as to its organization and method of operation, together with further objects and advantages thereof, may best be understood by reference to the following description taken in connection with the drawings.

BRIEF DESCRIPTION OF THE DRAWINGS

In the drawings:

FIG. 1 is a side elevational view, partly in cross-section and partly broken away, of apparatus particularly suited for carrying out one form of the preferred method of forming integral layers of electrical insulating material on preselected walls of slotted magnetic cores of electrical inductive devices;

FIG. 2 is an enlarged fragmentary view taken along line 2—2 in the direction of the arrows in FIG. 1 to show the manner in which the layers of electrical insulating material are formed on the magnetic core of the exemplification;

FIG. 3 is an enlarged fragmentary view in perspective of a part of the apparatus seen in FIG. 1;

FIG. 4 is an enlarged partial view in perspective of a member utilized in the apparatus of FIG. 1 in the formation of the integral layers of electrical insulating material;

FIG. 5 is a fragmentary cross-sectional view of a modified form of the method and apparatus illustrated in FIGS. 1–4 inclusive;

FIG. 6 is an enlarged partial side elevational view of the apparatus shown in FIG. 5; and FIG. 7 is an enlarged view of the manner in which an integral layer of electrical insulating material is being formed by the modified method and apparatus on the walls of one slot of slotted magnetic cores.

DESCRIPTION OF THE PREFERRED EMBODIMENTS

Turning now to the drawings in more detail, one preferred embodiment of the present invention has been illustrated by FIGS. 1–4 inclusive in connection with the formation of an adherent coating of electrical insulating material on a pre-heated magnetic stator core 10, formed of a stack of laminations, suitably punched into the desired configuration. In the exemplification, the core is of the type disclosed in the A. A. Brammerlo Pat. No. 3,235,762 and suitable for use in inductive devices such as small and fractional horsepower, alternating current induction motors. It includes an outer yoke section 11 and inwardly projecting tooth sections 12 which terminate in enlarged lips 13 to define a peripheral surface or central rotor receiving bore 14 and a number of angularly spaced apart axially extending slot entrances 16 providing communication between a corresponding number of coil accommodating slots and the bore. The slots extend axially between end faces 17, 18 of the core and are of two general sizes respectively identified in FIG. 2 by numerals 21, 22. The stack of laminations may be held together in any suitable way. For example, outwardly of the smaller slots is provided notches 23 which project transversely across periphery 24 of the stack for frictionally receiving.

The preferred form of the apparatus as illustrated in FIGS. 1–4 includes a central powder applicator unit, generally indicated by numeral 31 which is movable within a hollow powder and gas controlling unit 32, which in turn is disposed in bore 14 having a slip fit therewith next to tooth lips 13 and slot entrances 16. More specifically in the exemplification, unit 31 has an applicator head 33, cast of any suitable material like steel, fabricated with a gas chamber 34 for distributing gas such as air from a suitable source of pressure (not shown) to a number of angularly spaced apart gas feeding passages 36 corresponding in number and angular position to the slots in the core desired to be coated. For conveying the gas from the pressure source to chamber 34 there is provided a depending hollow sleeve 37 having one end threadingly received in the extreme end 38 of duct 39 which opens into the gas distributing chamber. Gas feeding passages 36 each terminate at their radially outer ends in an enlarged recess 41 constructed on the outer periphery of the head to provide a pocket where suitable dry insulating material 42 in pulverulent or powder form is picked up and directed outwardly by the gas stream being emitted from gas feeding passages 36.

The powder material is fed to the recesses from a suitable reservoir of powder material, which in the illustrated embodiment is carried by unit 31 in a fluidized bed 43 directly over head 33. As is well known, a fluidized bed is a mass of solid particles which have liquid-like properties of hydrostatic pressure, mobility, and an upper boundary where a discernible change in particle concentration occurs. To provide fluidization of the pulverulent coating material suitable gas, such as air, is admitted under pressure to the material which is stored in a generally cylindrical container or reservoir 44, through a frusto-conically shaped porous element 46 mounted centrally of the container. Gas is fed to the element from a suitable source of pressure (not shown) by way of tube 47 located within and in spaced relation to hollow sleeve 37, and a plurality of angularly spaced apart radial holes in collar 48 in communication with annular gas distributing chamber 49. This chamber is formed by cavity 51, provided in the bottom wall of element 46, and a plate 52 which also functions as the upper wall of chamber 34 and is attached to head 33 by screws 53 and to collar 48 by a tight fit next to the enlarged flange of the collar. Porous element 46, being pervious to the gas but impervious to the particles of the coating material, permits the gas to be directed outwardly from chamber 49 through the porous element into the reservoir to fluidize the particles.

The fluidized material is fed from the bed to the angularly spaced apart recesses of head 41 through axially extending channels 54 spaced outwardly from porous element 46 and plate 52 which terminates adjacent the upper entrances 56 of the recesses. As best seen in FIG. 3, a channel is provided in alignment with each recess entrance to facilitate transfer of the powder from the reservoir to the gas stream passing through the recess. A cylindrical sleeve member 57 is mounted onto container 44, as by an interference fit, outwardly of the channels and recesses in telescoping relation to head 33, to enclose the channels and recesses at that location. The sleeve includes an opening 58 furnished next to each recess to serve as a nozzle for directing the flow of gas and material toward the slot entrances.

By making the position of the openings 58 axially adjustable relative to passages 36, the powder distribution pattern can be readily regulated. This may be accomplished by forming a sliding clearance; e.g., 0.005 inch, between head 33 and the inner surface of member 57 and as seen in FIG. 1, adjustably attaching container 44 to head 33 by four spaced apart brackets 61 and integral hub 62 onto a flanged bushing 64. The bushing in turn threadingly engages a threaded stud 63 upstanding from collar 48 through porous element 46. With this arrangement, the desired relative axial position between head 33 and member 57 may be provided by turning bushing 64 on the stud and then locking hub 62 between the flange of bushing 64 and nut 66. Porous element 46 is firmly maintained between resilient washers 55, 65 so that it will not be moved upwardly by the gas in chamber 49. The lowest position of member 57 (as viewed in the drawing), and hence nozzles 58 relative to passages 36, is determined by the free ends of the side walls of the channels 54 which are adapted to bottom on the upper surface of head 33 between adjacent recess entrances 56.

In order to direct powder being emitted from the nozzles into the associated preselected slots of the preheated core and to insure that extremely little, if any, powder will be deposited on the core periphery forming the bore, the powder or material flow controlling unit 32 is arranged between the preheated core and the powder applicator unit 31. More specifically, unit 32 has a generally tri-angular-shaped and hollow partition members 67 disposed between and radially outward of adjacent nozzles, with the corner of the partition member facing the axis of the core. These partition members preferably extend for the axial length of the core so that converging walls of adjacent partition members in effect produce hollow members with separated passageways to direct the powder in a positive manner from each nozzle into the associated slots. The outermost walls of unit 32 conform to the curvature of the bore and are adapted to fit closely to tooth lips 13, for instance, being spaced about two mils from the peripheral surface forming the bore to permit the flow of coolant therebetween.

By circulating a cooling fluid, such as air, through each hollow partition member, the partition walls, including the curved wall 68 next to the core, can readily be kept below the temperature at which the coating material begins to change from a solid to a liquid form, that is, the melting temperature of the material. Elongated axially extending slots 69 are provided in wall 68 between adjacent partitions to furnish flow of the coolant between adjacent slot entrances thereby assisting in the prevention of powder build-up on the core bore. This arrangement provides a pressure barrier at that location to augment the guiding action of partions 67 near the slot entrances and reduces the temperature of the core at localized bore regions near wall 68. To facilitate effective and efficient circulation of the coolant, the enclosed spaces within the hollow partitions are in communication with and are joined together at each end by annular enclosed compartments, 71, 72, positioned axially beyond the core. The compartments and partitions are adapted to be connected to a suitable source of coolant under pressure (not shown) such as air, by conduits 73 which project into the lower compartment 72.

In the illustrated exemplification, the coating apparatus is also furnished with an arrangement for concurrently forming an insulative coating on core end faces 17, 18 as the coating is being applied onto the slot walls of the core. This is accomplished by positioning frusto-conical walls 76 of powder deflector or diffusion members 77, 78 (FIG. 1) next to the core in the vicinity of the respective end faces, the walls becoming radially less in dimension as the axial distance of the surfaces increases with respect to the associated end face. Walls 76 may be constructed from any suitable material, such as concrete, and may be maintained below the melting temperature of the material by surrounding each wall with an annular coolant-carrying enclosure or compartment 71 and furnishing ingress and egress to the compartments from a suitable source of coolant; e.g., air, respectively by conduits 82, 83.

The preferred manner in which coating material 42 is deposited on preselected regions of the core, that is, on the end faces 17, 18 in a coating of the desired thickness terminating short of the outer core periphery, and on the walls of slots 21, 22 by the illustrated apparatus will now be considered in more detail. After the uncoated core has been pre-heated to the proper temperature, that is, within the correct temperature range where the coating material properly melts, flows, and coalesces (e.g., 190° C. to 232° C.), the core is installed over units 31, 32 onto powder deflector member 77 which, in turn, is supported on a horizontal platform or table 84 such that slot entrances 16 are in radial alignment with nozzles 58 and wall 76 is in overlapping relation with the upper edge of a powder collector 86. A number of plastic parts 87, fitted into grooves 23 of the core, support the core with its axis vertical and may be used to attain the desired radial alignment. Thereafter, upper deflector member 78 is placed into the position revealed by FIG. 1 and gas path A is established to the material contained in the reservoir for producing fluidized bed 43. At the same time, coolant flow paths C and D are initiated.

The axial position of unit 31 relative to unit 32 should be such that the nozzles 58 face their associated slot entrances 16. For cores having short stack lengths, that is, approximately one inch and below, unit 31 may be held stationary during the application of material, with the nozzles preferably being located at the axial center of the core. Otherwise, it is desirable to initiate the flow of powder with the nozzle disposed in the axial vicinity of one of the end faces of the core. Gas flow B at a suitable pressure is then produced through sleeve 37, passages 36 to recesses 41 where the powder material, fed from fluid bed 43 through channels 54, is picked up and directed in a stream toward the slots. Unit 31 may be vibrated if desired to keep the particles in the fluidized bed and channel 41 in proper motion and additional material added to the reservoir as needed during the coating operation.

As the individual powder streams leave the nozzles, they are guided into the slots, best shown in FIGS. 1 and 2, where the powder assumes a slightly swirling and turbulent action as it is deposited on the slot walls. Due to the proximity of the nozzles at this time to one end face of the core, some of the material 42 will travel axially beyond the confines of the slots at that location and into engagement with the mediate end face of the core. This engagement and the coating obtained thereby is effectively augmented and controlled by wall 76 which directs the powder toward the end face. The relative radial positions of wall edge 88 and the core will determine to a great extent the total radial coverage provided on the end face being coated. Any excess material not adhering to the core is captured for reuse by powder collector 86.

For stacks greater than one inch in length, unit 31 may be moved linearly at a steady rate for the length of the core by any convenient manner (e.g., hydraulic cylinders) to deposit material along the length of the core in a uniform coating and on the other end face of the core. By virtue of coolant path C which contacts the inner regions of the lips 14 and by making the dimensions between adjacent partitions slightly smaller than the transverse dimensions of the slot entrances 16, powder build-up in the entrances 16 is minimized to permit satisfactory subsequent insertion of coil turns into the slots. If desired, after unit 31 has made the first full axial pass for the length of the core, it may be indexed one or more slots and returned to its original position as powder is continuously being directed into the slots from nozzles 58 to insure adequate coverage of each slot. This is also desirable if the number of nozzles 58 are less than the total number of slots to be coated. As the powder material is being deposited onto the desired walls of the core, the heat energy emitted from the core walls causes the powder 42 deposited thereon to melt and flow slightly. The deposited material gels and coalesces into a generally uniform, imperforate, and adherent integral coating.

The following example is given for the purpose of illustrating more clearly how the present invention as described above has been carried forth in actual practice, without necessarily limiting the scope of the invention to the example being given.

A number of thirty-six slotted cores, identical with that of the illustrated exemplification, were constructed with the following nominal dimensions:

|  | Inches |
|---|---|
| Outer stack diameter | 5.477 |
| Bore diameter | 3.125 |
| Width for slot entrance 16 | 0.088 |
| Width of lips 14 | 0.188 |
| Maximum width for slot 21 | 0.23 |
| Minimum width for slot 21 (adjacent bore) | 0.10 |
| Width for slot 22 | 0.14 |
| Radial depth of slot 21 | 0.636 |
| Radial depth of slot 22 | 0.385 |

The stack lengths were of various dimensions. Material was applied to these cores in the manner previously described.

The following are nominal dimensions of certain components of the apparatus and gas pressures employed:

| | |
|---|---|
| Gas passage 36 diameter inch | 0.045 |
| Width of recess 41 do | 0.125 |
| Width (diameter) of applicator nozzle 58 do | 0.125 |
| Width of opening 69 do | 0.015 |
| Gas pressure to chamber 49 p.s.i. | 0.5–5 |
| Gas pressure to chamber 34 p.s.i. | 2–20 |
| Gas pressure to annular compartments 71, 72, 81 p.s.i. | 5–30 |

The linear rate of relative axial movement between the core and nozzles 58 varied in the range of 3–10 inches per second.

A number of different powder resins were employed as powder 42. For instance, among others, a synthetic polyester resin of the type disclosed in U.S. Pat. No. 2,936,-396—Precopio and Fox, assigned to the General Electric Company was used. The results obtained with these materials employing the above-mentioned apparatus, pressure settings and the like were satisfactory; e.g., coating fairly uniform throughout the slots and on end faces 17, 18 at ten mils while coverage on the edges of the core was of approximately equivalent thickness. Moreover, the coverage was generally imperforate (void free) and adhered well to the walls of the cores. It was found that for slotted cores over two inches in length, at least two passes were desirable, the coating attained being primarily dependent upon rate of relative movement between the core and unit 31, material employed and particle size (preferably in the range of 0.002–.010 inch). Adjustment of nozzles 38 relative to passages 36, size and shape of nozzles 38, pressure of paths A and B, and pre-heat temperature of the core. It was further discovered that enhanced results occurred with the use of the present invention shown in FIGS. 1–4 inclusive with respect to a temperature drop in the core beyond the desired range and lack of powder build-up at the periphery of the bore, slot entrances 16, and end faces adjacent the bore.

Turning now to the embodiment shown by FIGS. 5–7 inclusive, the illustrated method and apparatus are especially adapted to carry out the method are essentially the same as that described above in connection with FIGS. 1–4 inclusive, differentiating therefrom principally in the exact construction of the insulating material or powder flow controlling unit, identified by numeral 102 in FIGS. 5–7, and the precise manner in which the separated streams of insulating material are directed into the slots through the slot entrances. For the sake of brevity and convenience in presentation, the second embodiment is illustrated in connection with the same stator core 10 exemplification shown in the first four figures, and like parts are identified in FIGS. 5–7 by like references already used.

More specifically, like in the first embodiment, flow controlling unit 102 is arranged between the pre-heated core 10 and applicator unit 31 to direct material in separated streams from the nozzles 58 through passageways into associated slots. Unit 102 differs from unit 32 already discussed in that the number of hollow members having separated passageways are produced by block-like elements 103 formed of suitable material such as steel and being generally rectangular in cross-section, which are mounted in recesses 104 of a metallic annulus 106 machined to receive the elements such that the passageways or channels 107 extend somewhat radially between the nozzles of unit 31 and the associated slots. Any means, for example, rings 108 may be employed to hold or clamp the elements and annulus together. Annulus 106 is also furnished with axially projecting ducts 109 which, like the hollow partitions of the first embodiment, are in communication at their respective end with enclosed annular compartments 71, 72 positioned axially beyond the core. Rectangular shaped grooves 111 connect the ducts with the outer periphery walls of unit 102 which generally conform to the curvature of the stator bore and are in spaced relation with the core to form a small passage therewith, e.g., 2 mils.

It should be noted at this time that elements 103 producing the hollow members terminate at the outermost ends in extensions 112, dimensioned to extend into and beyond the slot entrances. The outer walls of each extension are dimensioned to be in spaced relation with adjacent walls of the slot entrance. With this arrangement the extensions guide the separated streams of insulating material into the individual slots past the restricted slot entrances, thereby reducing the tendency of the material to become built up on the slot entrance walls where it is usually not desirable to deposit material which might subsequently interfere with the introduction of wire into the slots proper.

In addition, the outer walls of the extensions also aid in preventing the tendency of material build-up on the slot entrance walls by defining a path for the flow of coolant fluid, for example air, which travels into annular compartments 71, 72 similar to the first embodiment, then as best seen in FIG. 7 into conduits 109, grooves 111, spaces 113, 114, and along the outer walls of extension head 116 until the fluid expands outwardly to become dissipated within the slot without affecting the discharge of the material streams from the passageways 107. The flow of coolant in this manner in effect establishes a fluid barrier in the vicinity of the upper part of the slot entrance where it becomes enlarged to prevent entry of material onto the slot entrance walls. The coolant also tends to maintain unit 102, including extensions 112 below the melting temperature of insulating material.

In actual practice it has been found that best results occur when the extension is dimensioned to provide a space 114 with a width in the range of .007 to 0.20 inch (7–20 mils) and a flow pressure in the neighborhood of 12–70 p.s.i. Generally speaking, below 7 mils and a pressure of 12 p.s.i. a bridge of material may be formed. For many applications above 20 mils and 70 p.s.i., the movement of fluid is such that it may adversely affect the coating operation. It has further been observed that certain curved cross-sectional configurations for the outer wall of the head of extension 109 disposed slightly above the location on the slot walls where a coating is desired (starting at 117 in FIG. 7) will guide the fluid flow toward and possible interference with the stream of material emerging from the passageway. A flat surface 118 of the type illustrated insures the proper expansion of the fluid at a location in the slot where it will not interfere with the stream of material. Also, the termination of passageway 107 should not be located too far above location 117, preferably a fraction of an inch, and surface 118 should be disposed near location 117 for best coating results. If desired, axially spaced apart ribs (not shown) may be employed in the elements to augment their rigidity.

Since, in other respects, the way in which the stator is coating by the method and apparatus of the second embodiment is similar to that already outlined with regard to FIGS. 1–4, no additional description will be set forth.

Although the present invention has been illustrated in connection with stator cores, it has application, of course, to a diversity of different articles capable of being preheated, e.g., rotor and transformer cores, having at least one entranced longitudinally extending preselected slot in communication with a peripheral surface through a slot entrance where it is desirable to provide a protective generally uniform adherent coating of material on the walls of the slot.

It will be appreciated from the foregoing that the improved apparatus and method disclosed above is capable of forming an improved integral coating of protective insulating material on preselected locations of solid articles, such as the walls of slotted structures and end faces of the structure. This coating may be made generally uniform in thickness and imperforate throughout its entire extent even with the use of commercially available powdered resins which melt, gel, and start to coalesce in the temperature range of 190° to 232° C. In addition, by the present invention, this protective coating may be formed in an unusually short period of time while the already rapid heat loss of the pre-heated article being coated is minimized. Moreover, powder build-up in regions not desired to be coated, such as a stator bore, slot entrances near the bore, and the like, is effectively and efficiently prevented. The foregoing advantages and features are achieved while permitting versatility and economy in the mass production manufacture of slotted structures.

It should be apparent to those skilled in the art that while I have shown and described what at present is considered to be the preferred embodiments of my invention in accordance with the patent statutes, it is to be understood that modifications can be made thereto without actually departing from the true spirit and scope of this invention and I therefore intend to cover in the following claims all such equivalent variations as fall within the invention.

What I claim as new and desire to secure by Letters Patent of the United States is:

1. A method of concurrently forming an adherent integral coating of insulating material onto walls of preselected slots of a slotted structure having slot entrances in communication with a peripheral surface of the slotted structure, the method comprising the steps of: simultaneously directing separated streams of insulating material toward associated slot entrances of the preselected slots from locations adjacent the slot entrances; maintaining the insulating material in separated streams until the insulating material is at least in close proximity with the entrances of the preselected slots while concurrently preventing insulating material build-up on the peripheral surface of the slotted structure between adjacent separated streams; and coating the walls of the preselected slots by the insulating material which enters the preselected slots in the separated streams through the associated slot entrance.

2. The method set forth in claim 1 in which the preselected slots extend between a pair of end faces of the slotted structure and, during the step of simultaneously directing the separated streams of insulating material toward associated slot entrances, forcing a portion of the insulating material beyond the preselected slots in the vicinity of a least one end face and directing at least some of the portion into engagement with selected regions thereof by insulating material deflecting means disposed near the at least one end face.

3. The method set forth in claim 1 including the step of transferring insulating material, stored in a reservoir in the vicinity of the locations adjacent the slot entrances, to the locations as insulating material is being simultaneously directed toward associated slot entrances of the preselected slots from the locations.

4. The method of claim 1 including the step of directing the separated streams of insulating material to locations in the individual preselected slots beyond their associated slot entrance; and concurrently preventing the tendency of insulating material to build-up on the peripheral surface of the slotted structure as well as on the walls of the slot entrances by passing fluid along the peripheral surface between adjacent separated streams and into contact with associated walls of the slot entrances to create a positive fluid barrier to the passage of insulating material along the slot entrance walls.

5. A method of applying an insulating material in powder form which melts at a predetermined temperature onto walls preheated above the predetermined temperature of at least one preselected slot having a slot entrance in communication with a peripheral surface of a slotted structure having the at least one preselected slot, the method comprising the steps of: directing a stream of insulating material from a location outside the at least one preselected slot through a hollow member extending at least near the slot entrance, and concurrently preventing insulating material build-up on at least the peripheral surface of the slotted structure by passing fluid along an outer wall of the hollow member into contact with the peripheral surface; and coating the pre-heated walls of the preselected slot by insulating material which has passed through the slot entrance thereof.

6. The method set forth in claim 5 in which the preselected slot extends between a pair of end faces of the slotted structure and during the step of coating the pre-heated walls of the preselected slot by insulating material which has passed through the slot entrances, forcing a portion of the insulating material entering the slot beyond confines of the preselected slot in the vicinity of at least one end face directing a part of the portion and into engagement with selected regions thereof by insulating material deflecting means disposed near the at least one end face.

7. The method of claim 5 including the steps of: directing a stream of insulating material from a location outside the at least one preselected slot, through the hollow member, which projects into the slot entrance in spaced relation with the walls thereof, and to a location in the preselected slot beyond the slot entrance; and concurrently preventing insulating material build-up on the walls of the slot entrance by passing the fluid along the outer wall of the hollow member into contact with the adjacent walls of the slot entrance to create a positive fluid barrier at that location.

8. Apparatus for concurrently applying a mass of insulating material which coalesces when heated to a predetermined temperature into an integral coating, onto heated walls having a temperature above the predetermined temperature of a preselected plurality of slots, with the pre-heated slotted structure slots having entrances in communication with a peripheral surface, the apparatus comprising an applicator unit including a head formed with a gas distribution chamber, a plurality of spaced apart passages, each extending between the gas distributing chamber and a recess; means for supplying insulating material concurrently to each of the recesses, means for feeding gas to said gas distributing chamber through said passages to the recesses; and nozzle means associated with each recess adapted to be positioned in alignment with each of the entrances of the preselected slots for directing a stream of gas-carrying insulating material from the recesses toward the respective entrances of the preselected slots and into the slots to coat the slot walls whereby dissipation of heat from the slot walls is effectively reduced to maintain the temperature thereof above the predetermined temperature as long as possible.

9. The apparatus in claim 8 in which means including a fluidized bed of insulating material is mounted adjacent the head, in communication with the recesses, for storing the insulating material to be used and for transferring it to said means for supplying the insulating material to the recesses.

10. Apparatus for applying insulating material onto the walls in a preselected plurality of slots extending between a pair of end faces of a slotted structure having slot entrances in communication with a peripheral surface of the structure and on selected regions of at least one end face, the apparatus comprising a plurality of nozzle means adapted to be positioned adjacent the peripheral surface of the structure for concurrently directing a stream of insulating material toward the entrances of each of the preselected slots; means for supplying the insulating material to the nozzle means, and means mounted adjacent the at least one end face for confining the material in the vicinity of the selected region and for directing insulating material, which may leave the slots at the at least one end face, onto the selected region to insure a coating thereon.

11. The apparatus set forth in claim 10 in which insulating material controlling means is adapted to be arranged between said nozzle means and the peripheral surface for guiding the insulating material in separated streams from said nozzle means to the associated slot entrances and for minimizing potential insulating material build-up in the peripheral surface between adjacent separated streams.

12. The apparatus set forth in claim 10 in which means including a fluidized bed is mounted next to said nozzle means for containing insulating material and said means for supplying insulating material to said nozzle means comprises channels communicating between each nozzle means and said fluidized bed for concurrently transferring insulating material from the bed to said plurality of nozzle means.

13. Apparatus for concurrently applying a mass of insulating material onto walls in a plurality of preselected slots of a stator core having slot entrances in communication with walls forming a rotor receiving bore, the apparatus comprising means adapted to be accommodated in the bore for directing a stream of insulating material toward the entrances of each of the preselected slots; means for supplying the insulating material to the first mentioned means; and insulating material controlling means adapted to be disposed between said first mentioned means and the bore walls for guiding the material in separated streams from the first mentioned means toward the slot entrances and for preventing insulating material build-up on the bore walls between adjacent slot entrances.

14. The apparatus of claim 13 for applying the material onto the stator core which has the preselected slots extending between a pair of end faces, the apparatus further comprising means adapted to be mounted adjacent at least one of the end faces for confining the material in the vicinity of a region on the end face to be coated and for directing insulating material, which may leave the preselected slots, onto that region to provide a coating on that region.

15. In apparatus for applying insulating material onto walls of at least one preselected slot having walls forming a slot entrance in communication with a peripheral surface of a slotted structure formed with the preselected slot, an insulating material flow controlling unit including a hollow member having a passageway adapted to extend from one location spaced from the peripheral surface of the slotted structure to another location in the vicinity of the slot entrance walls; means for supplying insulating material to the passageway of the hollow member at the one location whereby the hollow member is adapted to transfer the insulating material in a stream through the passageway to the other location for coating the walls of the preselected slot; and means for passing fluid along an outer wall of the hollow member and into contact with the peripheral surface next to the slot entrance, with the hollow member assisting in the guidance of the fluid into such contact thereby aiding to prevent the tendency of insulating material to build-up on at least the peripheral surface next to the slot entrance.

16. The insulating material flow controlling unit of claim 15 wherein the hollow member has a hollow extension dimensioned to fit in the slot entrance in spaced relation with respect to the slot entrance walls such that the fluid is adapted to pass into the space between the outer wall of the hollow extension and the slot entrance walls associated therewith to assist in preventing material build-up on the slot entrance walls, with the hollow extension thereby aiding to prevent the tendency of material build-up on the slot entrance walls, and with the hollow extension tending to be maintained below a predetermined temperature by the fluid.

References Cited

UNITED STATES PATENTS

| | | | |
|---|---|---|---|
| 2,336,946 | 12/1943 | Marden et al. | 117—18 |
| 3,016,875 | 1/1962 | Ballentine et al. | 117—18 X |
| 3,074,808 | 1/1963 | Harrison | 117—18 |
| 3,093,510 | 6/1963 | Olson et al. | 117—18 X |
| 3,247,004 | 4/1966 | Dosser | 117—18 |
| 3,261,707 | 7/1966 | Korski et al. | 117—18 |
| 3,291,630 | 12/1966 | Deyle et al. | 117—21 X |
| 3,355,309 | 11/1967 | Bender et al. | 117—18 |
| 3,355,310 | 11/1967 | De Jean et al. | 117—18 |
| 3,367,789 | 2/1968 | Mommsen | 117—18 |
| 3,470,010 | 9/1969 | Christiansen | 117—21 X |

MURRAY KATZ, Primary Examiner

P. ATTAGUILE, Assistant Examiner

U.S. Cl. X.R.

117—21, 25; 118—301, 311, 317